United States Patent
Vegesna et al.

(10) Patent No.: US 12,307,274 B2
(45) Date of Patent: May 20, 2025

(54) METHODS AND SYSTEMS FOR VIRTUAL TOP-OF-RACK IMPLEMENTATION

(71) Applicants: Srinivas Vegesna, Sunyvale, CA (US); Jayaprakash Kumar, Bangalore (IN); Pramod Venkatesh, Bangalore (IN); Naresh Kumar Thukkani, Bangalore (IN)

(72) Inventors: Srinivas Vegesna, Sunyvale, CA (US); Jayaprakash Kumar, Bangalore (IN); Pramod Venkatesh, Bangalore (IN); Naresh Kumar Thukkani, Bangalore (IN)

( * ) Notice: Subject to any disclaimer, the term of this patent is extended or adjusted under 35 U.S.C. 154(b) by 0 days.

(21) Appl. No.: 16/356,426

(22) Filed: Mar. 18, 2019

(65) Prior Publication Data

US 2020/0104152 A1  Apr. 2, 2020

Related U.S. Application Data

(63) Continuation-in-part of application No. 15/996,522, filed on Jun. 4, 2018, now abandoned.

(51) Int. Cl.
*G06F 9/455* (2018.01)
*H04L 12/46* (2006.01)
*H04L 61/45* (2022.01)

(52) U.S. Cl.
CPC ...... *G06F 9/45558* (2013.01); *H04L 12/4633* (2013.01); *H04L 12/4666* (2013.01); *H04L 61/457* (2022.05); *G06F 2009/4557* (2013.01); *G06F 2009/45575* (2013.01); *G06F 2009/45579* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| 10,263,832 B1 * | 4/2019 | Ghosh | H04L 43/16 |
| 11,212,224 B1 * | 12/2021 | Austin | H04L 12/46 |
| 2010/0195489 A1 * | 8/2010 | Zhou | H04L 45/245 |
| | | | 370/216 |

(Continued)

FOREIGN PATENT DOCUMENTS

| CN | 105245504 A | * | 1/2016 | |
| WO | WO-2018086013 A1 | * | 5/2018 | H04L 49/70 |

OTHER PUBLICATIONS

Davies et al., Scale Out with GlusterFS, 2013, pp. 1-5 (Year: 2013).*

(Continued)

*Primary Examiner* — Abu Zar Ghaffari

(57) ABSTRACT

A computerized method includes providing a first virtual machine on first server. With the first virtual machine, communicating a network traffic to a second virtual machine. With a virtual function (VF) on a physical network interface controller (pNIC) of the second server, assigning to the VLAN to a specified VF. A data packet is sent out of the pNIC towards a Top-of-rack (TOR) switch. The method sends the data packet to a second TOR switch. With the second TOR switch, sending the data packet towards the pNIC based on a destination of the second virtual machine's Media Access Control (MAC) address.

1 Claim, 8 Drawing Sheets

(56) References Cited

U.S. PATENT DOCUMENTS

| | | | | |
|---|---|---|---|---|
| 2012/0014387 | A1* | 1/2012 | Dunbar | H04L 61/103 |
| | | | | 370/400 |
| 2012/0163388 | A1* | 6/2012 | Goel | H04L 12/4641 |
| | | | | 370/395.53 |
| 2014/0108665 | A1* | 4/2014 | Arora | H04L 67/563 |
| | | | | 709/227 |
| 2014/0112205 | A1* | 4/2014 | Prakash | H04L 12/4625 |
| | | | | 370/256 |
| 2014/0119380 | A1* | 5/2014 | Bakhshi | H04L 12/467 |
| | | | | 370/409 |
| 2014/0307744 | A1* | 10/2014 | Dunbar | H04L 45/64 |
| | | | | 370/401 |
| 2015/0063353 | A1* | 3/2015 | Kapadia | H04L 45/745 |
| | | | | 370/392 |
| 2015/0156124 | A1* | 6/2015 | Tsuji | H04L 47/6275 |
| | | | | 370/230 |
| 2015/0381495 | A1* | 12/2015 | Cherian | H04L 61/2592 |
| | | | | 370/392 |
| 2016/0112350 | A1* | 4/2016 | Morrison | H04L 49/557 |
| | | | | 370/218 |
| 2016/0350151 | A1* | 12/2016 | Zou | H04L 49/70 |
| 2017/0026263 | A1* | 1/2017 | Gell | H04L 67/1023 |
| 2017/0093618 | A1* | 3/2017 | Chanda | H04L 45/72 |
| 2017/0163599 | A1* | 6/2017 | Shen | H04L 12/4633 |
| 2017/0264622 | A1* | 9/2017 | Cooper | G06F 21/606 |
| 2017/0295033 | A1* | 10/2017 | Cherian | H04L 45/745 |
| 2018/0034747 | A1* | 2/2018 | Nataraja | H04L 49/70 |
| 2018/0091425 | A1* | 3/2018 | Bacher | H04L 45/745 |
| 2018/0173557 | A1* | 6/2018 | Nakil | H04L 41/0631 |
| 2018/0181421 | A1* | 6/2018 | Connor | G06F 9/45558 |
| 2018/0213441 | A1* | 7/2018 | Mehta | H04W 28/085 |
| 2018/0232334 | A1* | 8/2018 | Oved | G06F 13/4278 |
| 2019/0044887 | A1* | 2/2019 | Cai | H04L 45/245 |
| 2019/0238365 | A1* | 8/2019 | Sudhakaran | G06F 9/45558 |

OTHER PUBLICATIONS

Tseng et al., "Network Virtualization with Cloud Virtual Switch," 2011 IEEE 17th International Conference on Parallel and Distributed Systems, Tainan, Taiwan, 2011, pp. 998-1003 (Year: 2011).*

Del Piccolo et al. "A Survey of Network Isolation Solutions for Multi-Tenant Data Centers," in IEEE Communications Surveys & Tutorials, vol. 18, No. 4, pp. 2787-2821, 2016 (Year: 2016).*

* cited by examiner

METHODS AND SYSTEMS FOR VIRTUAL TOP-OF-RACK IMPLEMENTATION

CLAIM OF PRIORITY AND INCORPORATION BY REFERENCE

This application claims priority from U.S. application Ser. No. 15/996,522, filed on 4 Jun. 2018. U.S. application Ser. No. 15/996,522 claims priority from U.S. Provisional Application No. 62/572,661, filed 16 Oct. 2017. These applications are hereby incorporated by reference in their entirety for all purposes.

FIELD OF THE INVENTION

The invention is in the field of computer networks and more specifically to a method, system and apparatus for emulating an SR-IOV based sandbox lab environment(s).

DESCRIPTION OF THE RELATED ART

Recent years have seen the disaggregation of network infrastructure and virtual network functions replacing physical network functions. Furthermore, lines between public and private cloud infrastructure are being blurred. Accordingly, methods to provide quick and easy ways for network operators to adopt solutions based on multi-vendor products (some of them cloud based) are desired to enable transformation of said networks.

SUMMARY

In one aspect, a computerized method includes the step of providing a first virtual machine on first server. The method includes the step of, with the first virtual machine, communicating a network traffic to a second virtual machine on a second server using a virtual network identified with a virtual local area network (VLAN). The method includes the step of, with a virtual function (VF) on a physical network interface controller (pNIC) of the second server, assigning to the VLAN to a specified VF. The method includes the step of, sending a data packet is sent out of the pNIC towards a TOR switch, wherein the TOR switch has the VLAN enabled and other user specific policies configured. The method includes the step of, sending the data packet to a second TOR switch. The method includes the step of, with the second TOR switch, sending the data packet towards the pNIC on the second server based on a destination the second virtual machine's MAC address. The method includes the step of, with the VF on pNIC on the second server, receiving the data packet via the VLAN. The method includes the step of determining the destination MAC address and sends the data packet to the VM on the second server after removing a VLAN tag.

In another aspect, a computerized method includes, the step of, with a first virtual machine (VM) on a first server, sending a data traffic to a second VM on a second server in a virtual network identified by a specified VLAN. The method includes the step of, with a virtual function (VF) on a physical network interface controller (pNIC) of the first server, assigning a VLAN to it. The method includes the step of, with a controller, adding a Media Access Control (MAC) address of the second VM to redirect a data packet to an appropriate physical function (PF) the pNIC of the second server, wherein the PF is part of bond0 (e.g. a virtual bonding network interface), and wherein the data packet reaches the bond0 as a single logical interface. The method includes the step of, with the controller; creating a new sub-interface bond0 and classifying a VLAN packet. The method includes the step of, with the controller, creating an OVS switch on the first server. The method includes the step of, with the controller; creating a tunnel to other server OVS switch. The method includes the step of, inserting the data packets into the inside the tunnel and communicating the data packet to a destination. The method includes the step of, with the controller, adding a user specific policies on the OVS switch to send the data packet towards a specified VF via a specified bond0. The method includes the step of, from the specified bond0, communicating the data packet to a physical function (PF) on a second pNIC on the second server. The method includes the step of, with the second pNIC checking a destination MAC address of the second VM and sending the data packet to the specified VF of the second VM on the second server.

BRIEF DESCRIPTION OF THE DRAWINGS

The present application can be best understood by reference to the following description taken in conjunction with the accompanying figures, in which like parts may be referred to by like numerals.

Figure 1:
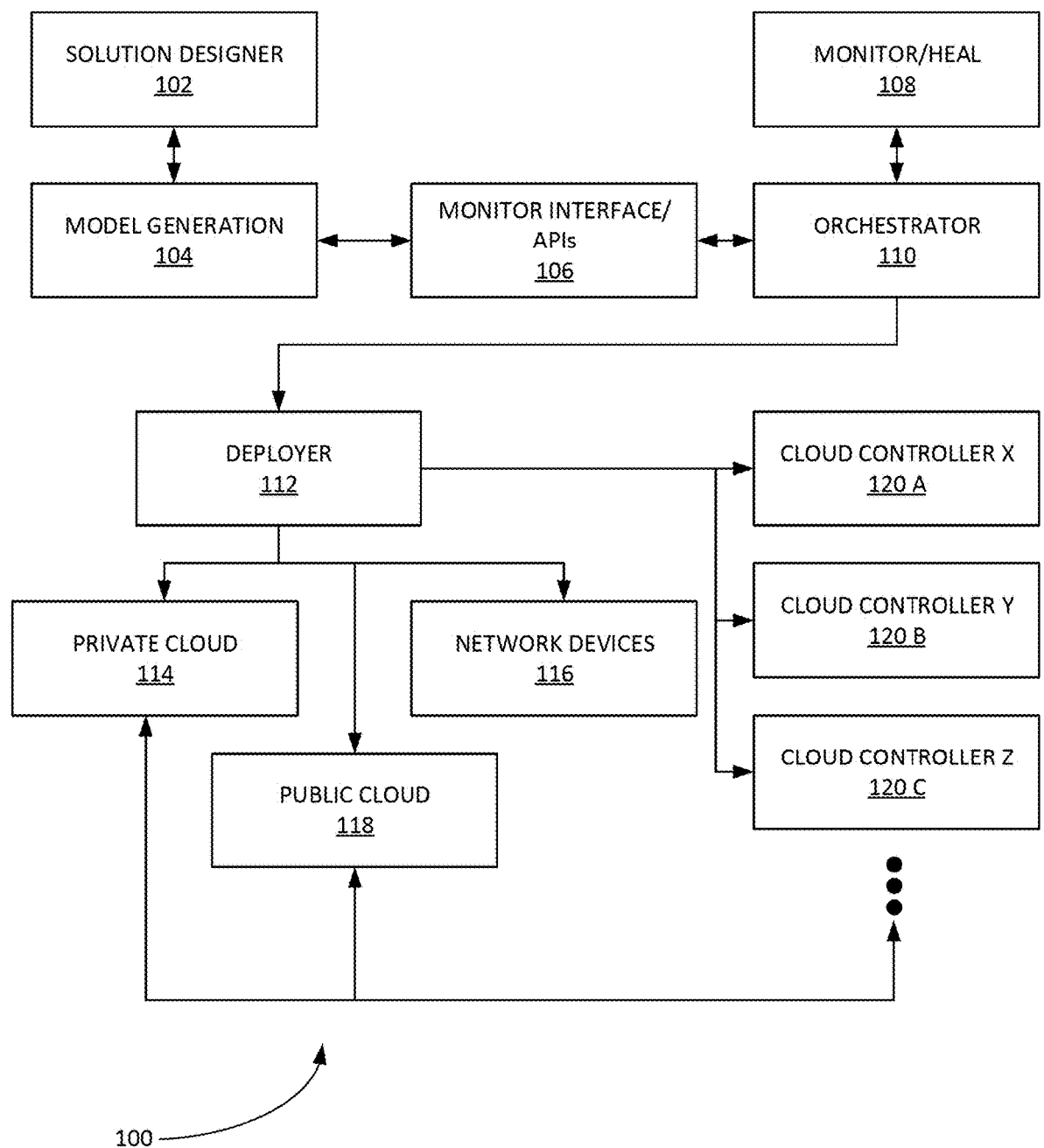
FIG. 1 illustrates an example SaaS-based Platform system, for solution orchestration of SDN/NFV cloud solutions according to some embodiments

The Figures described above are a representative set, and are not an exhaustive with respect to embodying the invention.

DESCRIPTION

Disclosed are a system, method, and article of manufacture of virtual TOR implementation. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Bonding driver (BOND) provides a method for aggregating multiple network interface controllers (NICs) into a single logical bonded interface.

Hypervisor is computer software, firmware or hardware that creates and runs virtual machines.

Input-output memory management unit (IOMMU) is a memory management unit (MMU) that connects a direct-memory-access-capable (DMA-capable) I/O bus to the main memory.

Internet Protocol (IP) address can be a computer's address under the Internet Protocol.

Network interface controller (NIC) can be electronic hardware that enables a computer to communicate over a computer network.

Network functions virtualization (NFV) is a network architecture concept that uses the technologies of IT virtualization to virtualize entire classes of network node functions into building blocks that may connect, or chain together, to create communication services.

Network Multi-Master Deployer (NMMD) includes the following components: Node Discovery Engine; Deployment Model Repository; Cluster Manager; Service Discovery Engine; and/or Central Manager.

Open vSwitch (OVS) is an open-source implementation of a distributed virtual multilayer switch.

Sandbox can be an online environment in which code or content changes can be tested without affecting the original system.

Single root input/output virtualization (SR-IOV) can be a specification that allows the isolation of the PCI Express resources for manageability and performance reasons. A single physical PCI Express can be shared on a virtual environment using the SR-IOV specification. The SR-IOV offers different virtual functions (e.g. a SR-IOV Virtual Function) to different virtual components (e.g. network adapter) on a physical server machine. The SR-IOV allows different virtual machines (VMs) in a virtual environment to share a single PCI Express hardware interface.

Software as a service (SaaS) is a software licensing and delivery model in which software is licensed on a subscription basis and is centrally hosted.

Top-of-rack (TOR) switch can be a network architecture design in which computing equipment like servers, appliances and other switches located within the same or adjacent rack are connected to an in-rack network switch.

Virtual machine (VM) can be an emulation of a computer system. Virtual machines are based on computer architectures and provide functionality of a physical computer. Their implementations may involve specialized hardware, software, or a combination.

Virtual LAN (VLAN) is any broadcast domain that is partitioned and isolated in a computer network at the data link layer.

Virtual Extensible LAN (VXLAN) is a network virtualization technology that attempts to address the scalability problems associated with large cloud computing deployments. It uses a VLAN-like encapsulation technique to encapsulate MAC-based OSI layer 2 Ethernet frames within layer 4 UDP packets.

Exemplary Systems of Emulating an SR-IOV Based Sandbox Lab Environment(S)

A SaaS-based Platform is provided that enables operators to learn, develop, test, evaluate and/or deploy multi-vendor network and information technology (IT) solutions. The SaaS-based Platform provides a framework to model the solutions on public and/or private cloud infrastructures. The SaaS-based Platform provides a practical means to test the assumptions around deployment. The SaaS-based Platform utilizes advanced software defined networking and virtualization concepts as an integral part of the platform.

FIG. 1 illustrates an example SaaS-based Platform 100, according to some embodiments. SaaS-based Platform 100 include various components as shown. SaaS-based Platform 100 can include Learning, Lab Services and Custom Solution Designs. These can be hosted in a cloud-orchestration platform (e.g. see infra). SaaS-based Platform 100 is a model driven solution-orchestration platform for SDN/NFV/Cloud solution design, development, testing, validation and deployment. SaaS-based Platform 100 provides a complete DevOPS enabled framework to do end to end orchestration of complex multi-vendor network solutions on public or private cloud infrastructure. SaaS-based Platform 100 includes an orchestrator engine and deployer that provides a means to do one touch deployment of virtual test-beds on physical/virtual networks and public/private cloud infrastructures. Deployments can be done on virtualized, bare metal or nested virtualized environments. Deployer can communicate with multiple cloud controllers which eventually communicate to public or private clouds (e.g. in parallel with network devices). SaaS-based Platform 100 includes an infrastructure for monitoring and self-healing of deployed services. SaaS-based Platform 100 includes a design and modelling framework that enables users to create and deploy the solutions. SaaS-based Platform 100 includes various billing/administrative functions. SaaS-based Platform 100 includes a Web/API interface as solution designer 102.

SaaS-based Platform 100 can suspend/resume features to save and recover deployed solutions. Accordingly, SaaS-based Platform 100 also provides a mechanism to test hardware acceleration capabilities on cloud infrastructure. SaaS-based Platform 100 provides a one touch deployment of solutions. SaaS-based Platform 100 provides a framework to extend the cloud-based test-beds into customer lab environments. SaaS-based Platform 100 can enable various secure deployments. In this way, SaaS-based Platform can enable various software defined networking, network function virtualization and cloud-based network solutions. Many of the functionalities can be implemented by orchestrator 110. Orchestrator 110 can be accessed via monitor interface/APIs 106. Orchestrator 110 can be a solution orchestrator.

Model generation 104 enables, for every topology in terms of a custom design of a solution, the generation of topology models (e.g. based on YANG). Monitor/heal 108 can implement active monitoring of the components of SaaS-based Platform 100. Monitor/heal 108 can provide a monitoring and healing capacity for a virtual network solution. Deployer 112 deploy the solution provided by orchestrator 110 to a public cloud 118, private cloud 114, etc. Deployer 112 can monitory network devices 116. Cloud-controllers 120 A-C can be any cloud controller used to manage public cloud 118, private cloud 114, etc.

Figure 2:
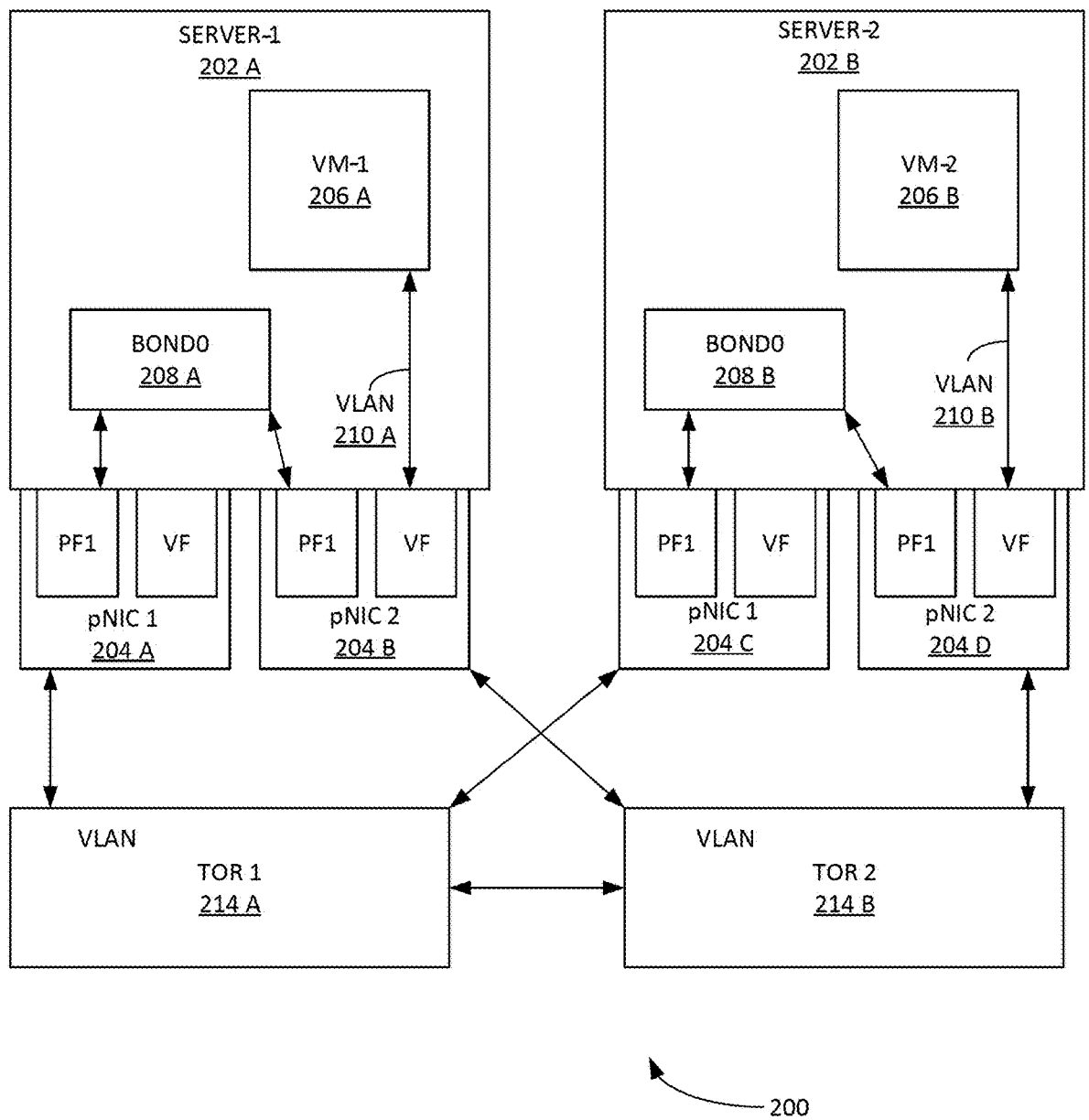
FIG. 2 illustrates an example building block system that enables various user specific policies used to achieve network virtualization, according to some embodiments.

FIG. 2 illustrates an example building block system 200 that enables various user specific policies used to achieve network virtualization, according to some embodiments. It is noted that with the advent of Network Function Virtualization (NFV), service providers are now looking to host network functions on virtualized servers as virtual machines (VM). It is further noted that multiple VMs can be hosted on a single physical server. A plurality of said physical servers (e.g. 202 A-B) can constitute a private-cloud environment for service providers. Since the network functions are to be in-line to customer traffic and process the traffic at high rates, there is a requirement to use NIC technologies (e.g. Single Root-Input Output Virtualization (SR-IOV)). SR-IOV virtualizes a single NIC into multiple virtual functions (VF) and each customer VM can be assigned one or more VFs. A VF can map the virtual memory addresses of customer VM. The virtual NIC and works along with an IOMMU unit in a server to send and receive the traffic from the outside the server and vice-versa. In that way, is bypassed, due to which the latency decreases and increases throughput of the customer traffic. NICs in system 200 can include pNICs (physical NICs) 204 A-D.

In a private cloud environment, service providers can create virtual networks for each customer and can host customer specific VMs within these virtual networks. It is noted that various network virtualization technologies can be used to achieve this functionality such that VMs launched on different physical servers can be seen as belonging to a single virtual network. In one example, network virtualization can enable a VF assigned to a customer VM to a specific VLAN (e.g. VLANs 210 A-B) at the server level. Network virtualization can configure these VLANs and associated respective policies at the Top-of-Rack switches (e.g. TORs 214 A-B). Accordingly, users (e.g. service providers, etc.) can have control on their servers and underlying infrastructure (e.g. Top-of-Rack switches, etc.) that they can provision accordingly.

Figure 3:
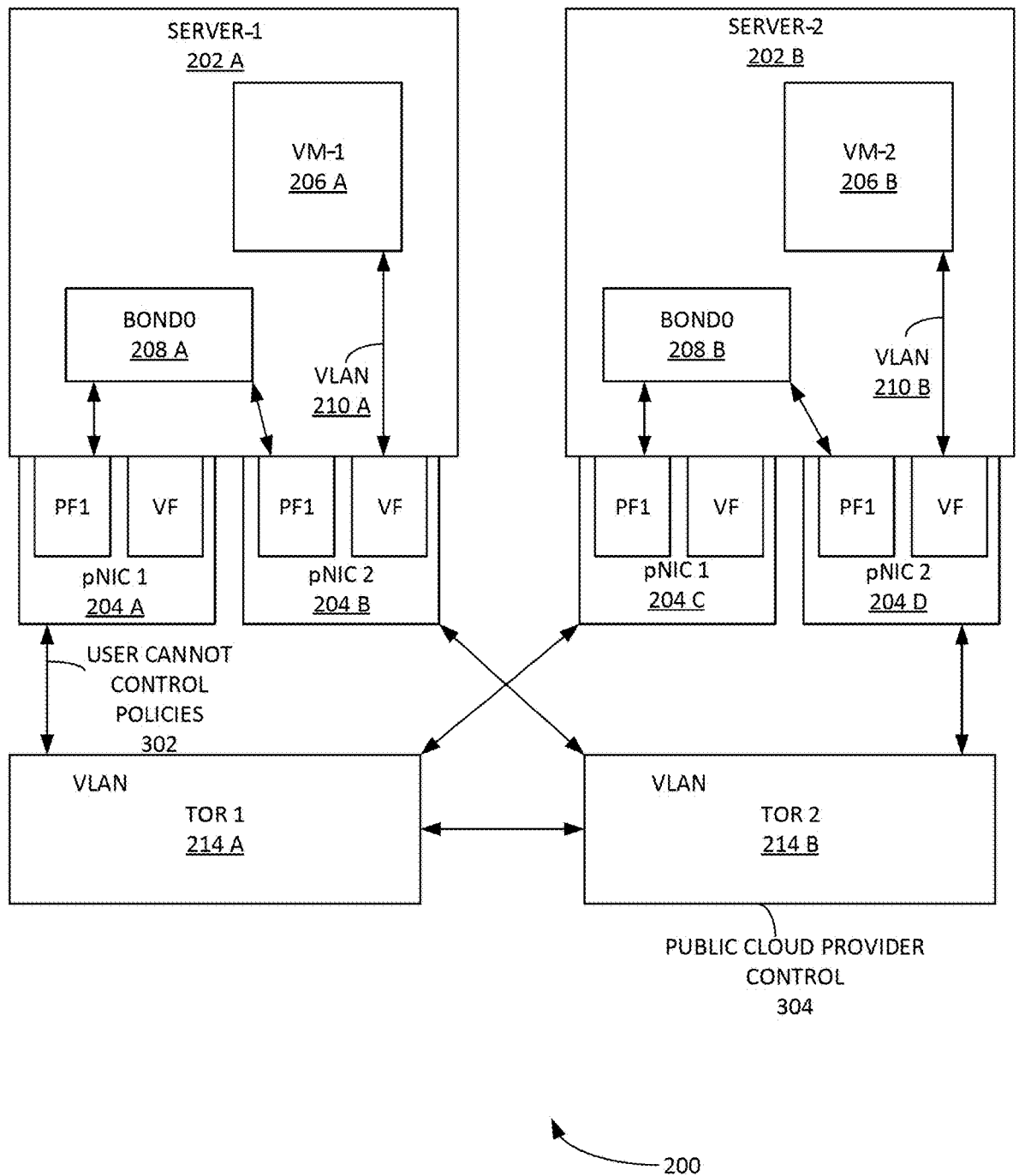
FIG. 3 illustrates challenges in emulating a SR-IOV based sandbox lab environment, according to some embodiments.

FIG. 3 illustrates challenges in emulating a SR-IOV based sandbox lab environment, according to some embodiments.

A service provider, data center or enterprise community can mimic their production level cloud environment into a sandbox lab environment. The end user community can bring-up these on-demand labs (e.g. sandbox lab environment) on public clouds. This on-demand sandbox labs can provide engineers and developers on demand cloud-based labs used for their learning, development, test, Proof-of-Concept and scale tests. However, the key challenge one faces when trying to emulate the SR-IOV based sandbox lab environments.

Figure 4:
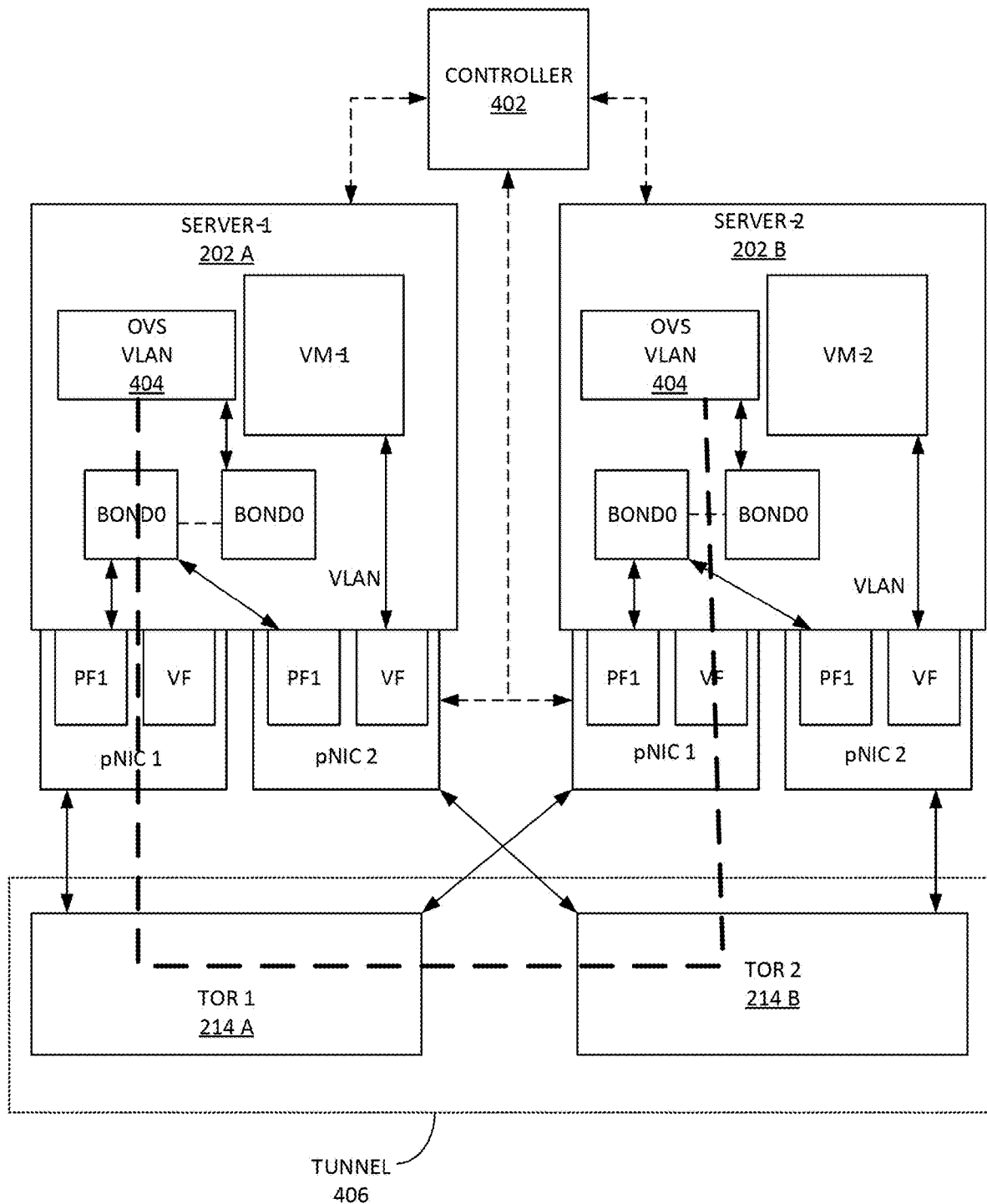
FIG. 4 illustrates an example system with a controller that SR-IOV based solutions on Public Cloud environments, according to some embodiments.

It is noted that, in FIG. 3, users can enable their specific policies on server level, they do not have access to enable the policies 302 at the TOR switches that are controlled by underlying Public cloud providers. Accordingly, the SR-IOV based solutions cannot be provisioned on public cloud providers. FIG. 4 illustrates a solution to this issue.

FIG. 4 illustrates an example system 400 with a controller 402 that SR-IOV based solutions on Public Cloud environments, according to some embodiments. Controller 402 can eliminate the above-mentioned problem(s) discussed with respect to FIG. 3. Controller 402 can enable SR-IOV based solutions on Public Cloud environments. Controller 402 can provide a framework as explained above to achieve the SR-IOV based solutions on public cloud platforms.

Example Methods for Emulating an SR-IOV Based Sandbox Lab Environment(S)

Figure 5:
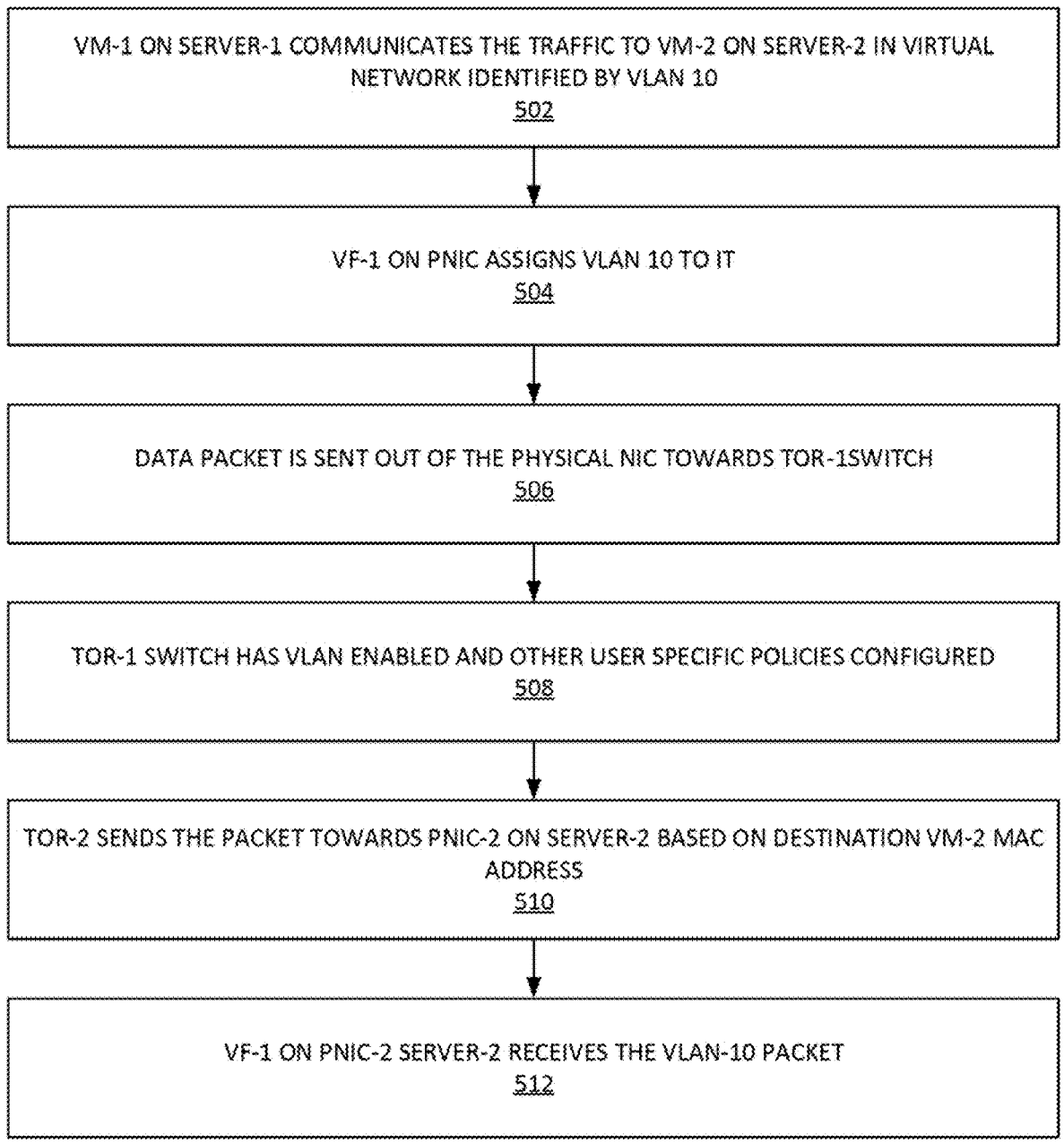
FIG. 5 illustrates and example process for an example packet flow, according to some embodiments.

FIG. 5 illustrates and example process 500 for an example packet flow, according to some embodiments. In some example embodiments, process 500 can be implemented on the system of FIG. 2. In step 502, a VM-1 206 A on Server-1 202 A communicates the traffic to VM-2 206 B on Server-2 202 B in the virtual network identified by VLAN (e.g. VLAN 210 A and/or VLAN 210 B). In step 504, a VF on pNIC-2 204 B (e.g. of Server-1 202 A) assigns VLAN to the respective VF. In step 506, since the MAC address of VM-2 206 B is not known to this pNIC-2 204 B, packet is sent out of the pNIC towards TOR switch 214 A. In step 508, the TOR 214 A switch has VLAN enabled and other user specific policies configured. Since it has a trunk connection towards Server-2 202 B, the packet is sent to TOR-2 214 B. In step 510, the TOR-2 214 B sends the packet towards pNIC-2 204 D on Server-2 202 B based on destination VM-2 MAC address. In step 512, the VF on pNIC-2 204 D of Server-2 202 B receives the VLAN-10 packet. It determines the destination MAC address and sends it to the VM-2 206 B after removing the VLAN tag.

Figure 6A:
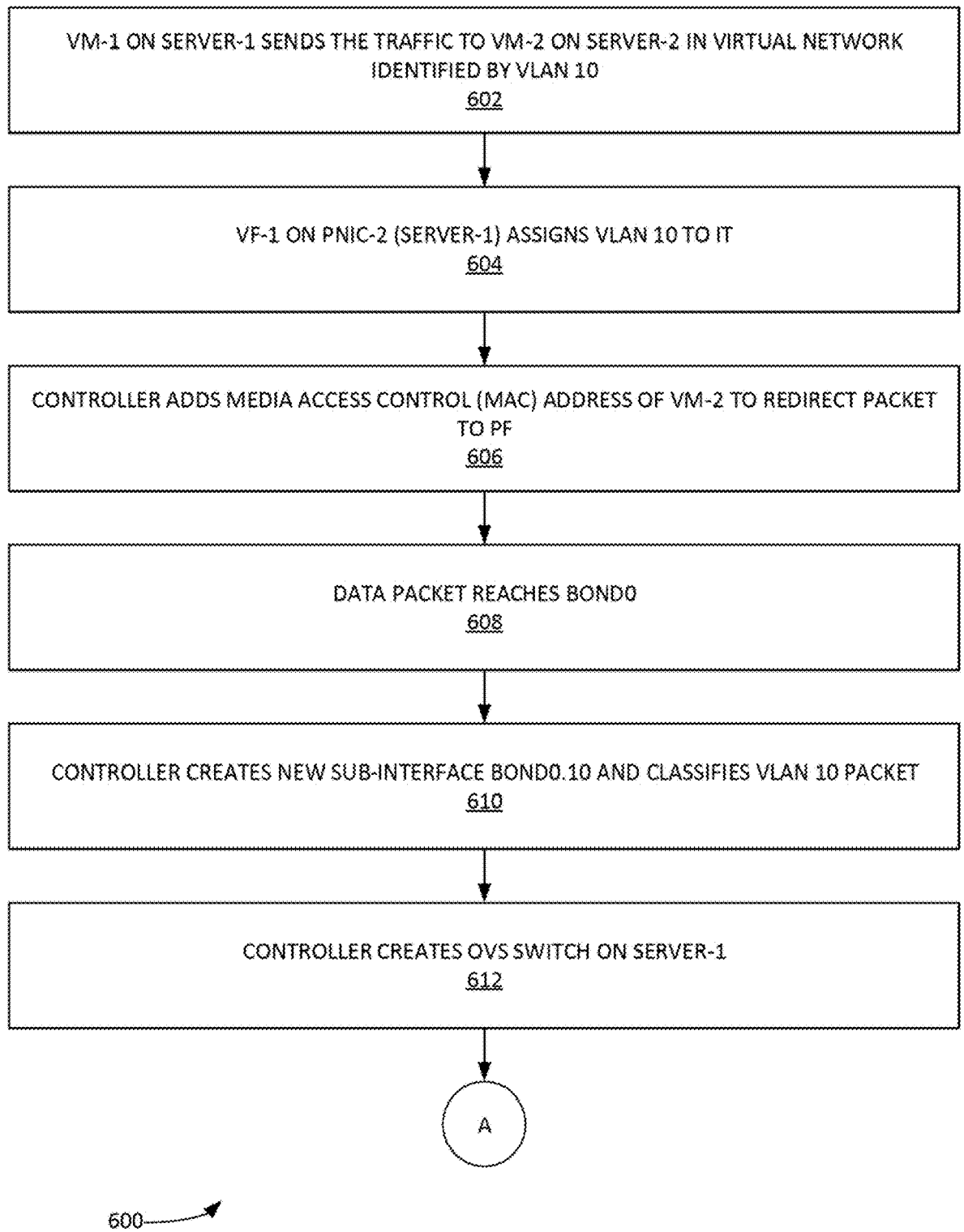
FIGS. 6 A-B illustrate an example process of a controller solution and packet flow, according to some embodiments.
Figure 6B:
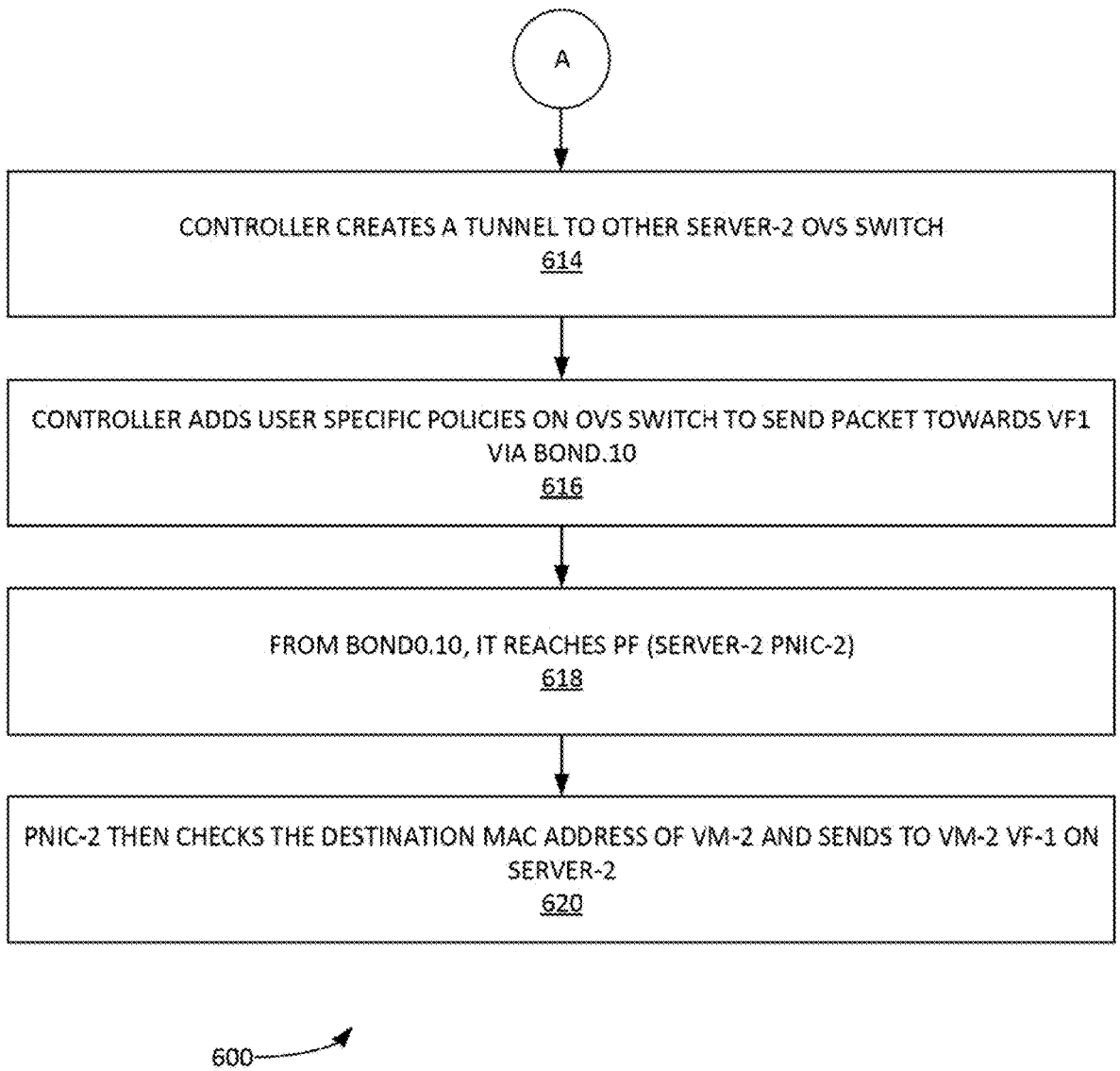

FIGS. 6A-B illustrate an example process 600 of a controller solution and packet flow, according to some embodiments. In some example embodiments, process 600 can be implemented on the system of FIG. 4. In step 602, VM-1 206 A on Server-1 202 A sends the traffic to VM-2 206 D on Server-2 202 B in virtual network identified by the respective VLAN. In step 604, VF on pNIC-2 204 B of server-1 202 A assigns a VLAN to it. In step 606, the controller adds Media Access Control (MAC) address of VM-2 206 B to redirect packet to the appropriate PF (e.g. of Server-1 202 A pNIC-2 204 B). In step 608, since the PF is part of bond0 (e.g. bond0s 208 A-B), the data packet reaches bond0 (e.g. a single logical interface). In step 610, controller 402 creates new sub-interface bond0 and classifies the VLAN packet. In step 612, controller creates OVS switch on Server-1 202 A (e.g. user specific policies can be inserted here as before to achieve network virtualization). In step 614, controller 402 creates tunnel 406 (e.g. VXLAN) to other Server-2 OVS switch. It is note that tunnel 406 can be any tunnel (e.g. an IP tunnel) and can be encrypted as well. The data packets are now inserted inside tunnel 406 and sent across. In step 616, controller adds user specific policies on OVS switch to send packet towards VF1 via bond0.10. In step 616, from bond0, it reaches the PF of pNIC-2 204 D on Server-2 202 B. In step 614, the pNIC-2 204 D then checks the destination MAC address of VM-2 206 D and sends it to the VF of VM-2 206 D on Server-2 202 B. In step 618, from bond0.10, it reaches pf (server-2 pnic-2). In step 620, pnic-2 then checks the destination mac address of vm-2 and sends to vm-2 vf-1 on server-2.

Additional Systems and Architecture

Figure 7:
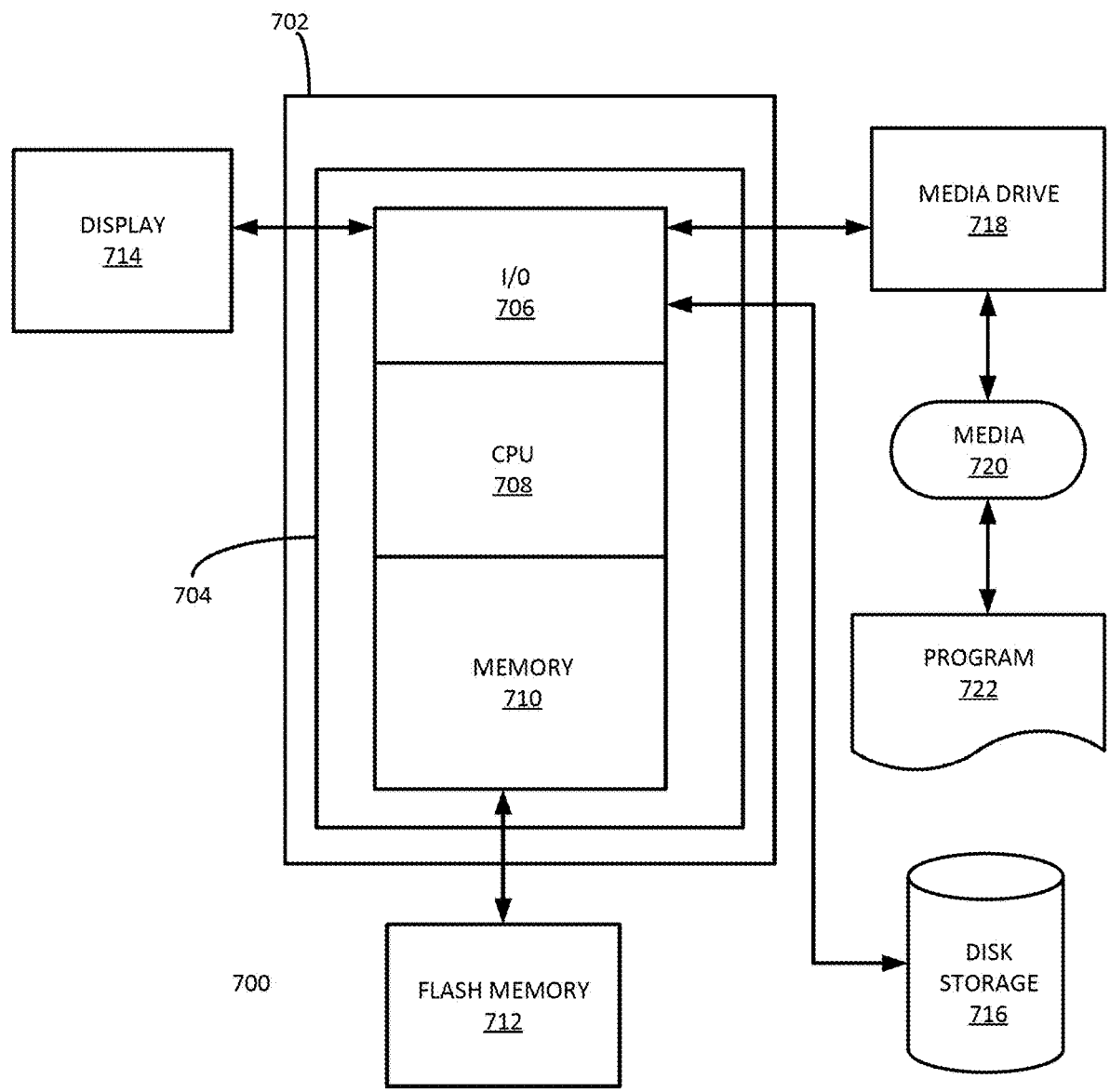
FIG. 7 depicts an exemplary computing system that can be configured to perform any one of the processes provided herein.

FIG. 7 depicts an exemplary computing system 700 that can be configured to perform any one of the processes provided herein. In this context, computing system1 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a motherboard 704 having an I/O section 706, one or more central processing units (CPU) 708, and a memory section 710, which may have a flash memory card 712 related to it. The I/O section 706 can be connected to a display 714, a keyboard and/or other user input (not shown), a disk storage unit 716, and a media drive unit 718. The media drive unit 718 can read/write a computer-readable medium 720, which can contain programs 722 and/or data. Computing system 700 can include a web browser. Moreover, it is noted that computing system 700 can be configured to include additional systems in order to fulfill various functionalities. Computing system 700 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A computerized method comprising:
with a first virtual machine (VM) on a first server, sending a data traffic to a second VM on a second server in a virtual network identified by a specified virtual local area network (VLAN);
with a controller, creating a first Open vSwitch (OVS) on the first server; with the controller, creating a second OVS on the second server;
with the controller, creating a tunnel between the first OVS of the first server and the second OVS of the second server; with the controller, creating a first virtual function (VF) on a first physical network interface controller (pNIC) of the first server, assigning a VLAN to the first VF; the controller creating a second VF on a second pNIC of the second server, assigning the VLAN to the second VF;
with the controller, adding a destination Media Access Control (MAC) address of the second VM to a data packet;
with the controller, creating a first rule to redirect the data packet to a first physical function (PF) of the first pNIC of the first server, wherein the first PF is part of a first bond0, and wherein the data packet reaches the first bond0 as a single logical interface;
with the controller, creating a new first sub-interface bond0 and classifying a VLAN packet for the new first sub-interface bond0, wherein the controller provides a set of policies that are inserted to the first OVS on the first server to achieve network function virtualization, and wherein the VLAN is a Virtual Extensible LAN (VXLAN); with the controller, inserting the data packet into the tunnel and communicating the data packet to a destination VM on the second server;
with the controller, inserting a user specific policies on the second OVS on the second server to achieve network function virtualization;
with the controller, sending the data packet towards a second sub-interface bond0, from a specified second bond0, communicating the data packet to a second physical function (PF) on a second pNIC of the second server, and with the second pNIC checking the destination MAC address of the second VM and sending the data packet to a specified VF of the second VM on the second server.

* * * * *